UNITED STATES PATENT OFFICE.

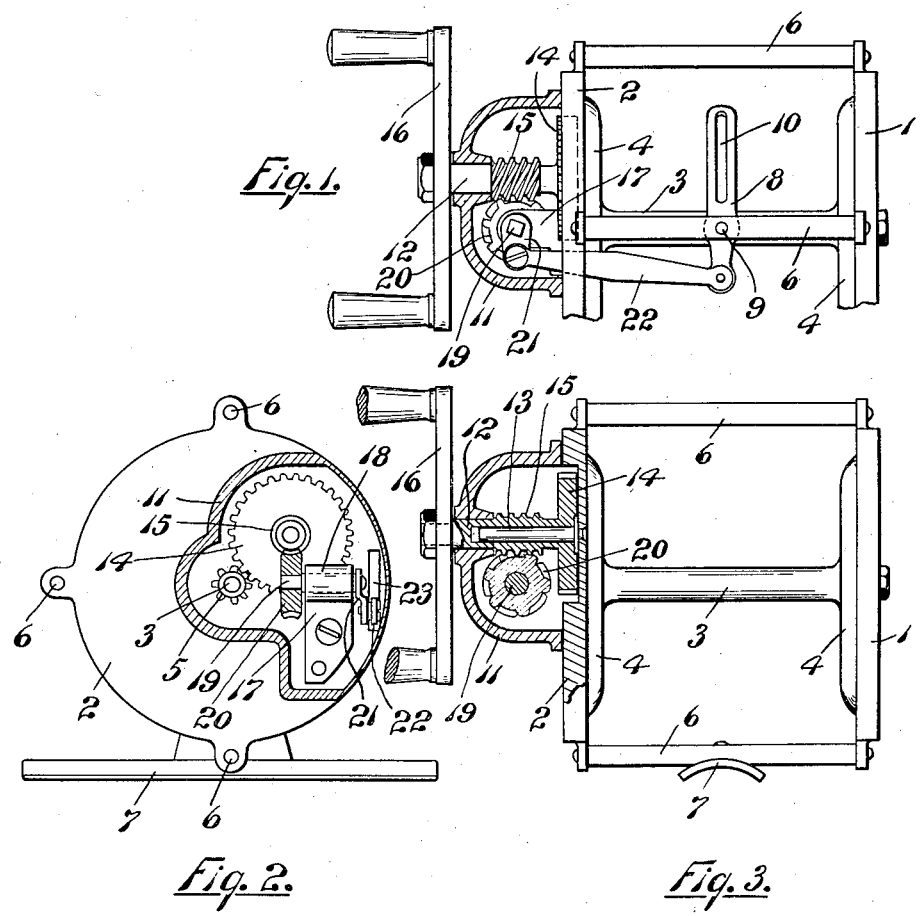

EARLE CLICKNER, OF KALAMAZOO, MICHIGAN, ASSIGNOR TO SHAKESPEARE COMPANY, OF KALAMAZOO, MICHIGAN.

FISHING-REEL.

1,369,785.  Specification of Letters Patent.  Patented Mar. 1, 1921.

Application filed June 14, 1919. Serial No. 304,329.

*To all whom it may concern:*

Be it known that I, EARLE CLICKNER, a citizen of the United States of America, residing at Kalamazoo, in the county of Kalamazoo and State of Michigan, have invented certain new and useful Improvements in Fishing-Reels; and I do hereby declare the following to be a full, clear, and exact description of the invention, such as will enable others skilled in the art to which it appertains to make and use the same.

This invention relates to fishing reels and has for its primary object and purpose the simplification of structure of the same so that the reel is one of easy action and at the same time has no parts particularly subject to wear such that the reel becomes worn out in a short time or needs frequent repair. With my invention a reel of great durability is provided, and the operating parts thereof are all along proper and accepted mechanical design such that a fully efficient yet practical, serviceable and durable construction is made.

For an understanding of the invention and the novel arrangements and constructions thereof, reference may be had to the following description, taken in connection with the accompanying drawing, in which, Figure 1 is a partial front elevation and section of the reel showing the line guide and the operating mechanism therefor.

Fig. 2 is a vertical section through the reel at one end, the opposite end being shown in elevation, and Fig. 3 is a partial end elevation and section, said section being taken through the operating mechanism of the reel.

Like reference characters refer to like parts in the different figures of the drawing.

In construction, the reel support or housing comprises end plates 1 and 2 between which the reel proper is mounted, the same including a central shaft 3 and ends 4 which are positioned adjacent the ends 1 and 2 of the support as shown. The shaft 3 passes through plate 2 and is provided with a pinion 5 at its end. A plurality of rods 6 are located between the plates 1 and are rigidly connected thereto in any preferred manner. The rods 6 are spaced apart and with the end plates 1 and 2 make a substantial support for the reel which is rotatably mounted thereon. This support is adapted to be attached to a pole or rod, plate 7 secured to one of the rods 6 being placed against the pole for that purpose. One of the rods 6 carries a line guide lever 8 which is pivotally mounted between its ends at 9 on the rod 6 and which is longitudinally slotted, as indicated at 10, the line passing through the slot and winding on the shaft 3.

A housing 11 may be attached to the end 2 of the support for the reel and a shaft 12 rotatably mounted in a suitable bearing formed therein. This shaft passes through the housing and is bored at its opposite end to receive a pin 13 which is rigidly attached to the end 2 and projects therefrom. The shaft 12 turns on the pin and at its inner end carries a gear 14 in mesh with the pinion 5. A worm 15 is formed on shaft 12 between its ends and the end of the shaft which extends through the housing 11 is provided with a crank handle 16 whereby the shaft may be turned by hand, it being obvious that with this operation the reel proper is driven through the engagement of gear 14 with pinion 5.

A bracket 17 terminating at its end in a bearing 18 is fixed to and projects from the end 2 of the support. This bracket is located within housing 11 and a short shaft 19 is rotatably mounted in bearing 18, one end having a worm wheel 20 thereon in engagement with the worm 15, while the other end has a crank 21 attached thereto which in turn is connected to one end of the line guide lever 8 by a link 22 passing through a slot 23 in the plate 2. From this construction, it is evident that simultaneously with the turning of the reel, the line guide lever is moved back and forth lengthwise of the reel, serving to guide the line so that it is wound evenly on the reel.

The construction of fishing reel described contains no parts not strictly in accord with the best accepted principles of mechanical design. For instance, the reel is driven by direct spur gearing connection between it and the operating shaft, and the line guide lever is also gear driven from the operating shaft and the use of a crank motion, all being tried and well known mechanical movements in which no part is liable to excessive wear and consequent early destruction necessitating repair. The combination of movements brought together gives a construction compact and strong, one in which the reel may turn in either direction very easily and one in which the pivoted line guide has its relatively greater travel in the direction of the length of the reel compensated by the crank movement which operates it so that the line is laid on the reel smoothly and evenly. Moreover, the parts are relatively simple to make from a manufacturing standpoint, thus keeping the cost of manufacture low.

I claim:

1. In a fishing reel, the combination of a frame comprising a head member and pillars, said head member being recessed on its outer side, a spool provided with a shaft projecting through said head member, a spool pinion disposed in said recess, a gear housing mounted on said head member and provided with a crank bearing, a stub shaft mounted on said head member in alinement with said bearing of said housing, a crank shaft mounted on said stub shaft and in said bearing on said housing, a spool driving gear disposed on the inner end of said crank shaft in said recess in said head member in mesh with said spool shaft pinion, a worm disposed on said crank shaft on the outer side of said spool driving gear, a line guide lever pivotally mounted on one of the pillars to project vertically in front of the spool, a line guide shaft, a bearing for said line guide shaft mounted on said head member, a worm gear on one end of said line guide shaft meshing with said worm on said crank shaft, a crank arm on the other end of said line guide shaft, and a link connecting said crank arm to said line guide lever, said head member being slotted to receive said link.

2. In a fishing reel, the combination of a frame comprising a head member and pillars, a spool provided with a shaft projecting through said head member, a spool pinion, a gear housing mounted on said head member, a stub shaft mounted on said head member, a crank shaft mounted on said stub shaft, a spool driving gear disposed on the inner end of said crank shaft in mesh with said spool shaft pinion, a worm disposed on said crank shaft on the outer side of said spool driving gear, a line guide lever pivotally mounted on one of the pillars to project vertically in front of the spool, a line guide shaft, a bearing for said line guide shaft mounted on said head member, a worm gear on one end of said line guide shaft meshing with said worm on said crank shaft, a crank arm on the other end of said line guide shaft, and a link connecting said crank arm to said line guide lever, said head member being slotted to receive said link.

3. In a fishing reel, the combination of a frame comprising a head member and pillars, said head member being recessed on its outer side, a spool provided with a shaft projecting through said head member, a spool pinion disposed in said recess, a stub shaft mounted on said head member, a crank shaft mounted on said stub shaft, a spool driving gear disposed on the inner end of said crank shaft in said recess in said head member in mesh with said spool shaft pinion, a worm disposed on said crank shaft on the outer side of said spool driving gear, a line guide lever pivotally mounted on one of the pillars, a line guide shaft, a worm gear on said line guide shaft meshing with said worm on said crank shaft, a crank arm on said line guide shaft, and a link connecting said crank arm to said line guide lever.

4. In a fishing reel, the combination of a frame comprising a head member and pillars, a spool provided with a shaft projecting through said head member, a spool pinion, a stub shaft mounted on said head member, a crank shaft mounted on said stub shaft, a spool driving gear disposed on the inner end of said crank shaft in mesh with said spool shaft pinion, a worm disposed on said crank shaft on the outer side of said spool driving gear, a line guide lever pivotally mounted on one of the pillars, a line guide shaft, a worm gear on said line guide shaft meshing with said worm on said crank shaft, a crank arm on said line guide shaft, and a link connecting said crank arm to said line guide lever.

In testimony whereof I affix my signature.

EARLE CLICKNER.